March 3, 1970   H. L. STONE ET AL   3,498,378
OIL RECOVERY FROM FRACTURED MATRIX RESERVOIRS
Filed June 9, 1967

John W. Graham
Herbert L. Stone   INVENTORS
Robert J. Blackwell

BY *James A. Reilly*
ATTORNEY 3,498,378
OIL RECOVERY FROM FRACTURED
MATRIX RESERVOIRS
Herbert L. Stone, Houston, John W. Graham, Bellaire, and Robert J. Blackwell, Houston, Tex., assignors to Esso Production Research Company, a corporation of Delaware
Filed June 9, 1967, Ser. No. 644,897
Int. Cl. E21b 43/20
U.S. Cl. 166—263    6 Claims

ABSTRACT OF THE DISCLOSURE

A method for recovering oil from fractured matrix reservoirs using cyclic pressure waterflooding and rendering the surface of the rock matrix oil-wet prior to the production phase.

BACKGROUND OF THE INVENTION

This invention pertains to a process for inserting a fluid into the pores of the formation by means of a shaft or deep boring in the earth commonly known as a well.

SUMMARY

Many reservoirs from which oil and gas are produced are relatively homogeneous with respect to porosity and permeability of the formation. However, it is recognized that a large number of producing formations, especially the carbonate rocks, are naturally and highly fractured. A typical example of such a reservoir is the Spraberry trend of West Texas.

Highly fractured reservoirs consist of two distinct elements, fractures and matrix, each having its characteristic porosity and permeability. The oil-bearing porous rock matrix is interlaced by an extensive network of naturally occurring fractures or fracture-like channels characterized by fluid conductivities which may exceed the matrix permeability by a factor of several thousand. Experience has proven that the recovery of oil from such reservoirs by normal production practices is far less efficient than from unfractured reservoirs having generally the same matrix character and initial fluid saturations. During the primary production, the natural reservoir pressure is rapidly depleted through the highly conductive fracture system, typically leaving more than 90% of the original crude saturation in place. In essentially the same manner, conventional methods of secondary recovery have failed to displace substantial volumes of oil.

Conventional waterflooding techniques are relatively ineffectual in highly fractured reservoirs. The floodwater tends to flow through the interconnected fissures, grossly bypassing the oil which is in the matrix. As a result, only that oil which is left in the fractures following primary production is recovered in conventional waterflooding. Waterflooding in these reservoirs in characterized by early water break-through and rapidly reached uneconomic producing water-oil ratios.

One modification of the conventional waterflooding process which has achieved limited success is countercurrent imbibition. In a fractured reservoir, if the rock surfaces of a matrix system are sufficiently water wet, limited recovery by this method is possible. Water is injected into the fractures and allowed to remain in contact with the rock matrix for a period of time ranging from weeks to several years. During this contact period water is spontaneously imbibed into the matrix and there is a countercurrent explusion of oil into the fracture system. The expelled oil is swept through the fractured system to production wells where it is recovered in the conventional manner. Waterflood recovery by countercurrent imbibition may be further improved by the use of surface active agents which reduce interfacial surface tension between the oil and water phase as disclosed in U.S. Patent 2,792,894. The effect of such surfactants is to further increase the water wettability of the rock matrix and/or to reduce the interfacial tension between the oil and water phases and thereby increase the ability of the rock to imbibe water and increase the oil expulsion. In a countercurrent imbibition process, with or without the addition of a water-wetting surfactant, the rate of oil recovery is dependent upon the capillary pressure characteristics of the porous rock matrix. That is, the imbibition process is essentially unaffected by conventional techniques for controlling field operations, such as selecting pressures and flow rates.

Another modification of the waterflooding process as applied to fractured reservoirs is known as cyclic pressure flooding or "pressure pulse" flooding. Cyclic pressure flooding is accomplished by alternately increasing and decreasing the net production and injection rates which thereby create a cyclic pressure differential between the rock matrix and the fracture system. The pressure pulse process does not rely primarily upon imbibition to displace reservoir oil. Instead, the cyclic variations in pressure force water in to the rock matrix and oil from the matrix into the fractures.

In the initial phase of cyclic pressure flooding, net fluid production is limited to a rate substantially below the volumetric water influx, whereby the reservoir pressure is raised to a high level. This phase of the cycle is known as the injection phase, during which little or no oil is produced. The pressure buildup in the fracture system forces a portion of the injected water to enter the porous matrix.

After a period of time sufficient to permit a substantial approach toward pressure equilibrium between the fracture system and the porous matrix, the production phase of the cycle is begun. Continued water injection is limited to a rate substantially below the net fluid production rate in order to reduce the reservoir pressure. Consequently, the pressure difference between the fracture system and the matrix blocks is reversed, thereby forcing oil from the pore system into the fracture system, where it is swept toward the production wells and recovered in a conventional manner.

Pressure pulse flooding has several distinct advantages over the countercurrent imbibition process. First, during the injection cycle, all wells are available for injection of reservoir fluid, giving a more rapid increase in reservoir pressure. Second, because increased injection pressures and rates are used, the influx of the floodwater into the rock matrix is accomplished more rapidly. Third, due to the increased pressure, more gas is redissolved into the oil which provides energy for oil displacement during the production phase. Fourth, all wells into the reservoir are available for production during the production phase, thereby increasing the production rate.

Although the cyclic pressure method does recover oil more rapidly, the amount of oil produced has proven to be about the same as produced in accordance with the imbibition process. It has been suggested, therefore, that oil production in the cyclic pressure process must be indirectly governed by essentially the same capillary forces as control the imbibition process.

The action of capillary forces during the cyclic pressure process tends to distribute oil and water saturations uniformly throughout each matrix block, regardless of the nature of inherent wettability characteristics of the rock. A uniform distribution of oil, however, is undesirable since the only producible oil is that located a relatively short distance from a fracture channel. The cyclic pressure method can recover substantially increased volumes of oil if the capillary characteristics of the porous matrix system are modified such that equilibrium oil saturations in the matrix near the fracture system exceed the average oil saturation.

Accordingly, it is an object of the present invention to improve the cyclic pressure waterflooding method of petroleum recovery from fractured reservoirs by establishing a favorable gradient of fluid saturations in the matrix pore system. More particularly, it is an object of the invention to modify the capillary imbibition characteristics of the porous matrix such that equilibrium oil saturations in the matrix near the fracture system exceed the average oil saturation prior to a production phase of the flood cycle.

These and other objects of the invention are accomplished by the addition of a suitable chemical to the injected floodwater at some time preceding the production phase of a waterflood cycle. Preferably, one or more such chemicals is added during the injection or repressuring phase of the first waterflood cycle. To the extent feasible, it is preferred to render the matrix face permanently oil-wet, whereby the addition of chemicals during subsequent waterflood cycles becomes unnecessary.

It is known that a large class of surfactants have the ability to increase the wettability of a rock matrix with respect to either oil or water. One end of the surfactant molecule is preferentially adsorbed on the surface of the rock matrix. The opposite end of the surfactant molecule will preferentially attract water if it is a water-wetting surfactant, or oil if it is an oil-wetting surfactant. Whether the rock matrix is rendered oil-wet or water-wet by a given surfactant depends on the physical chemistry of that surfactant as is well known to those skilled in the art.

The surface active agents employed in the practice of the present invention may be selected from a large group of surface active agents which cause preferential wetting of the earth solids, such as sand, clay, shale, lime, quartz, dolomite, and the like, with hydrocarbons which may be present therein. The earth or rock solids prior to the contacting operation are preferentially wet by the water in the rock solids. After the contacting operation the earth or rock solids are preferentially wet by the hydrocarbons.

Among the surface active agents which are valuable and operable in the present invention may be mentioned the amine salts, the ammonium salts, and many others of a similar type. Specifically, the cationic salts are valuable and useful in the present invention. Exemplary of the compounds which have been found suitable in preferentially wetting rock solids by the hydrocarbons contained therein may be mentioned octadecyl amine acetate; cetyl dimethyl amine acetate; Tetrosan, a cationic surface active agent solid by Onyx Oil & Chemical Company, Jersey City, N.J.; the acetate of Primene JM-T, which is a mixture of primary amines with branched chains containing from 15 to 20 carbon atoms, sold by Rohm & Haas; Arquad 2-C which is dicoco dimethyl ammonium chloride prepared from coconut oil; the amine acetate prepared from Primene 81-R, which is a mixture of primary amines containing branched chains of 12 to 15 carbon atoms, sold by Rohm & Haas; alkyl tolylmethyl trimethyl ammonium chloride; alkyl dimethyl benzyl ammonium chloride; lauryl benzyl dimethyl ammonium chloride; bis quaternary salts such as reaction products of 2-octyl benzyl chloride with bis dimethyl amino butyne and nonyl benzyl chloride with bis dimethyl amino butene; di-isobutyl cresoxyethyl dimethyl benzyl ammonium chloride and di-isobutyl phenoxyethoxy ethyl dimethyl benzyl ammonium chloride; and the like.

Suitable concentrations of the surfactant range from 0.05% up to as much as 5% by weight the upper limit being governed more by economics than technical feasibility. It is preferred to inject water containing from 0.2% up to about 2.0% by weight surfactant. The volume of surfactant-containing water injected should at least be sufficient to contact substantially all matrix faces through the fracture system. The upper limit on injected volume is governed primarily by pressure requirements of the flood and under most operating conditions the maximum bottom-hole pressure will be limited to the initial bottom-hole pressure of the reservoir.

The surfactant is strongly and preferentially adsorbed on the rock matrix, and, upon contact with the matrix, the surfactant will concentrate near the surface of the block. The depth of invasion of the surfactant will normally range from a few inches to a foot or more. The depth of invasion for given operating conditions can be readily determined in the laboratory using techniques which are well known to those skilled in the art. It should be noted that although the surfactant is primarily located very near the surface of the matrix block, appreciable quantities of oil will be concentrated in this zone due to the large surface area of the matrix blocks.

Once a portion of the rock matrix adjacent the fracture system is rendered oil-wet, capillary forces cause the oil to accumulate preferentially in the oil-wet zone, and water to accumulate preferentially in the water-wet zone. Therefore, during a subsequent production phase of the waterflood cycle, the oil which has accumulated near the matrix face is readily displaced into the fracture system.

DESCRIPTION OF THE DRAWINGS

The practice of the invention can be more clearly seen with reference to the drawings.

DETAILED DESCRIPTION

As was noted hereinbefore, capillary pressure is the force which governs the fluid distribution within the rock matrix in the practice of this invention. The practice of this invention can be most clearly explained by describing the relationships between capillary pressures, fluid saturations and wettability characteristics of the rock matrix.

The capillary pressure between two fluids in a porous medium is a measure of a variety of physical characteristics of the fluids and the rock matrix:

(1) It is the difference in pressure between the two fluids across their interface;

(2) It is a measure of the tendency of the rock to suck in the wetting fluid and to expel the non-wetting phase; and (3) It is a measure of the curvature of the interface between the two fluids.

In an oil reservoir, it is convenient to express the capillary pressure quantitatively as:

$$P_c = P_o - P_w$$

where $P_c$ = the capillary pressure between the oil and water
$P_o$ = the oil phase pressure at the interface
$P_w$ = the water phase pressure at the interface.

Figure 1:
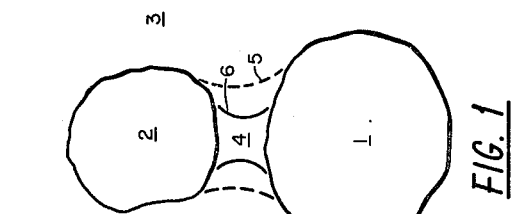
FIGURE 1 is sectional view of two grains of the rock matrix in a water-wet system.

In a water-wet system, the capillary pressure varies inversely with the water saturation. Two grains of the rock matrix of such a system with the wetting and non-wetting fluids are seen in FIGURE 1. Two grains 1 and 2 are surrounded by oil 3 as a non-wetting phase and hold between them water 4 as the wetting phase. At a high water saturation, the interface between the wetting and nonwetting phases will assume the configuration shown at 5. But as the water saturation decreases, the interface withdraws to the position shown in 6. It can be seen that, as the water phase decreases in saturation, the curvature of the interface increases, thereby increasing the capillary pressure between the wetting and nonwetting phases.

Figure 3:
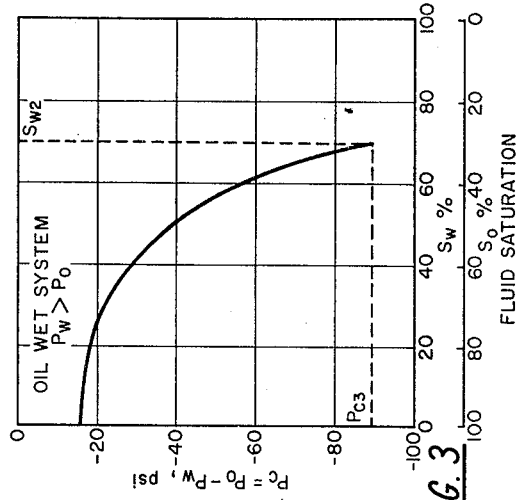
FIGURE 3 is a plot of the capillary pressure versus fluid saturation in the same core as FIGURE 2 but which has been rendered oil-wet by the addition of a suitable surfactant.
Figure 2:
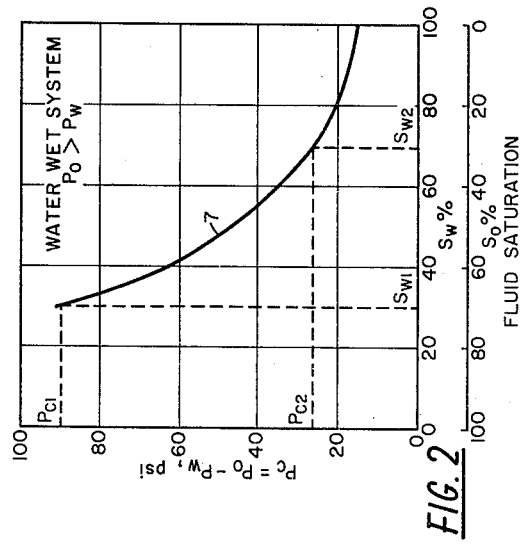
FIGURE 2 is a plot of capillary pressure versus fluid saturation in a water-wet core of the rock matrix.

FIGURES 2 and 3 show the relationship between capillary pressure and fluid saturation for a water-wet system and an oil-wet system, respectively. Referring to FIGURE 2, it is seen that as the water saturation increases, the capillary pressure decreases along the trace shown by curve 7. In the water-wet system illustrated in FIGURE 2, the capillary pressure always has a positive value; that is, the pressure in the oil phase is always greater than the pressure in the water phase. The driving force tending to distribute the fluids within the rock matrix is the difference in capillary pressure between any two given points in the matrix.

In a rock matrix into which water is being injected, the water saturation at the interior of the rock matrix will be at an initial low level, $S_{w1}$, having a corresponding capillary pressure $P_{c1}$. At the face of the fracture, the water saturation is relatively high, $S_{w2}$, having the corresponding capillary pressure $P_{c2}$. The force available to distribute the fluids within the reservoir rock is the difference in capillary pressures, $P_{c1}-P_{c2}$.

In FIGURE 3 the corresponding capillary pressure-fluid saturation relationship is shown for an oil-wet system having the same geometric configuration of pore spaces as the water-wet system in FIGURE 1. In this system, $P_c$ is neagtive; that is, the pressure in the water phase always exceeds the pressure in the oil phase.

Considering both FIGURES 2 and 3, it can be seen that by inverting the wettability of the face of the rock; that is, changing the surface of the rock matrix from a water-wet system to an oil-wet system, the driving force available to expel oil from the center of the rock matrix to its face has been increased from $P_{c1}-P_{c2}$ to $P_{c1}-P_{c3}$. This effect would tend to concentrate the oil in the wetting phase at the surface of the rock matrix prior to the production phase.

Figure 5:
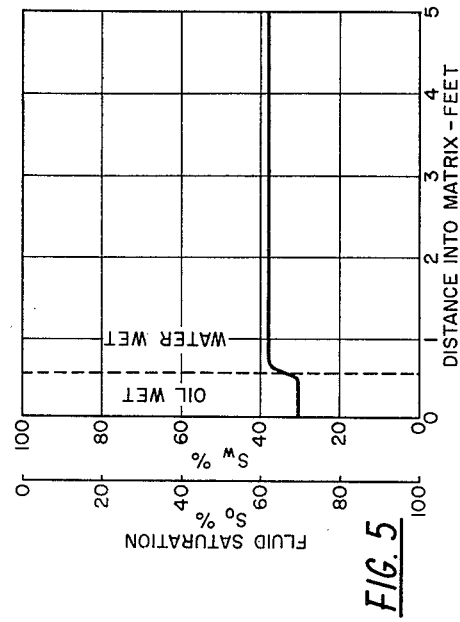
FIGURE 5 is a plot of fluid saturation versus depth in the rock matrix subsequent to the injection phase and inversion of the wettability of the surface of the rock matrix.
Figure 4:
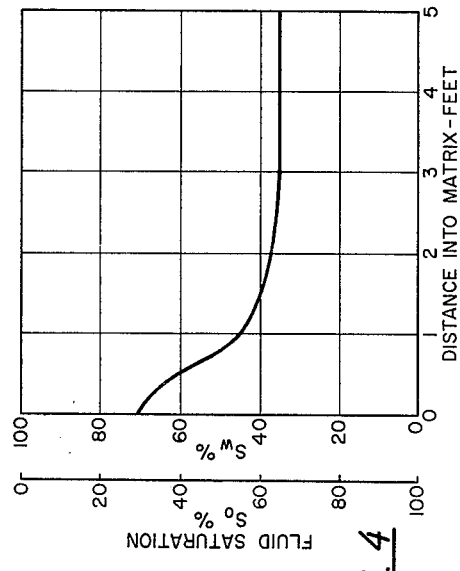
FIGURE 4 is a plot of fluid saturation versus depth in the rock matrix of a water-wet system subsequent to the injection phase but prior to the production phase of the cyclic pressure process.

FIGURES 4 and 5 are a compartive illustration of the fluid saturations within the matrix for a water-wet system having its wettability inverted at the face of the rock matrix. FIGURE 4 shows the fluid distribution in the rock matrix subsequent to the injection phase but prior to the production phase of the cyclic pressure process. At the interior of the matrix, the water saturation is at a low, nearly constant level. At the face of the matrix and extending for some distance into the block, the water saturation is relatively higher. In the production cycle of such a system, the high water saturation at the face of the fracture would interfere with the production of oil from the interior of the block.

FIGURE 5 illustrates the effect of changing the wettability of the surface of the matrix in this system. At the surface of the matrix, the oil saturation is realtively high. At the interior of the block, beyond the point at which the oil-wetting surfactant has contacted and adhered to the rock surface, the system is water-wet with a relatively low oil saturation and high water saturation. During the production cycle of the system illustrated in FIGURE 5, the initial production will be much higher in oil concentration and consequently much lower in water cut.

DESCRIPTION OF THE PREFERRED EMBODIMENT

In a naturally highly fractured reservoir such as the Spraberry Field of West Texas, production wells are drilled. The field is depleted of primary production, additional infill wells are drilled if necessary and waterflooding is initiated. In the preferred embodiment of this invention, a multiple well system is preferred. However, it is within the scope of this invention to use a single well for both injection and production.

During the injection phase it is preferred to use all of the wells in the field as injection wells to achieve fiill-up in the shortest time. However it is possible to inject and produce at the same time. It is only essential that fluid production be limited to a rate substantially below the water influx thereby raising the reservoir pressure to the desired level. In most instances the maximum reservoir pressure will be limited to the initial bottom-hole pressure of the reservoir to prevent breakdown of the reservoir confines. However, in certain reservoirs such as the Spraberry, which had an initial bottom-hole pressure of approximately 2,500 p.s.i., the injection bottom-hole pressure may be raised to approximately 3,000 pounds without reservoir damage due to an unusually large shale formation overying the producing horizon.

Water containing approximately 0.5% by weight octadecyl amine acetate is injected continuously unitl the desired bottom-hole pressure is reached. Although not preferred, this surfactant may be added only at the latter stage of the injection phase. The octadecyl amine acetate changes the wettability of the rock matrix for a determinable depth into the matrix from a water-wet system to an oil-wet system and will concentrate oil near the surface of the matrix block. The depth of penetration of the surfactant into the rock matrix can be readily determined using scale models in the laboratory and conventional techniques well known to those skilled in the art.

When the desired bottom-hole pressure is reached and after a sufficient period of time has elapsed to substantially permit pressure equilibrium between the fracture system and the porous matrix, the production phase of the cycle is begun. It is preferred to use all wells into the formation as producers in order to obtain the production in the shortest possible time. However, it is within the scope of the invention to continue injection through some wells while fluid is withdrawn through other wells during the production cycle. It is only essential that the fluid production rate be substantially above the water injection rate during the production phase. Production is continued until the produced oil-water ratio reaches an economic limit.

Oil is produced by means of the generated pressure differential between the matrix and fracture system and drawn to the producing wells. Since oil has been concentrated near the surface of the matrix blocks, the amount of oil recovered for a given pressure drop between the fracture and matrix will be substantially increased and the time lapse for a given quantity of oil production will be reduced.

A second cycle is begun by injection of water without surfactant. Normally surfactant will not need to be added during each injection phase. The benefit of the oil wetting surfactant will be realized for several pressure pulse cycles before the concentration of the surfactant in the matrix is reduced below the acceptable limits. However, once the oil production in the production phase has fallen below acceptable economic limits, additional surfactant can be added on later injection phases and the cyclic process continued until the reservoir is depleted.

It is to be understood that while the invention has been explained for purposes of clarity in terms of two-phase i.e. an oil-water system, normally three phases of oil, gas and water will be present in the reservoir and that the invention is equally applicable to such a system.

What is claimed is:

1. A method for the secondary recovery of oil from a naturally highly fractured reservoir having relatively impermeable matrix blocks and relatively high-permeable fractures and being penetrated by at least one well comprising:

(a) injecting an aqueous flood medium into the reservoir to increase the reservoir pressure;

(b) rendering oil-wet only the exterior portion of at least a portion of the matrix blocks; and (c) subsequently withdrawing fluid from the reservoir to reduce the reservoir pressure and to recover oil from the reservoir.

2. The method as defined in claim 1 wherein: the matrix blocks are rendered oil-wet by the addition of an oil-wetting surfactant to the injected aqueous flood medium.

3. The method as defined in claim 1 wherein:
(a) the aqueous flood medium is injected through at least one well; and
(b) fluid is withdrawn through at least one additional well.

4. The method as defined in claim 1 wherein the steps of injecting the aqueous flood medium to increase the reservoir pressure and withdrawing fluid to decrease the reservoir pressure are cyclically repeated.

5. The method as defined in claim 1 wherein the aqueous flood medium is injected and the fluid is withdrawn through the same well.

6. A method for the secondary recovery of oil from a naturally highly fractured reservoir having relatively impermeable matrix blocks and relatively highly permeable fractures and penetrated by a plurality of wells comprising:

(a) injecting an aqueous flood medium into the reservoir through substantially all of the wells;

(b) simultaneously injecting a surfactant capable of rendering a portion of the matrix of the reservoir oil-wet, the surfactant forming a solution with the flood medium and being injected at a rate of approximately 0.5% by weight surfactant in the solution;

(c) ceasing injection and permitting the injected solution to remain in contact with reservoir matrix until pressure equilibrium has been substantially established between the matrix blocks and fractures;

(d) producing oil through substantially all of the wells;

(e) repeating steps (a), (c), and (d) until the surfactant has been substantially depleted from the rock matrix;

(f) repeating step (b) when the surfactant has been substantially depleted from the rock matrix;

(g) then repeating steps (a), (c), and (d) until the surfactant has been substantially depleted from the rock matrix; and (h) cyclically repeating steps (a) through (g) to deplete the reservoir.

References Cited

UNITED STATES PATENTS

| | | | |
|---|---|---|---|
| 2,452,736 | 11/1948 | Eickmeyer. | |
| 2,606,871 | 8/1952 | Ten Brink | 166—42 X |
| 2,733,206 | 1/1956 | Prusick et al. | |
| 2,792,894 | 5/1957 | Graham et al. | 166—9 X |
| 2,846,012 | 8/1958 | Lorenz et al. | |
| 2,908,643 | 10/1959 | Thompson et al. | |
| 3,219,114 | 11/1965 | Oxford | 166—42 |
| 3,286,770 | 11/1966 | Knox et al. | 166—9 X |
| 3,368,620 | 2/1968 | Harvey | 166—9 |

OTHER REFERENCES

Enright, R. J.: Spraberry Cyclical Flood May Net 500 Million Bbl. of Oil, in Oil & Gas Jour., Oct. 1, 1962, pp. 68–77.

JAMES A. LEPPINK, Primary Examiner

IAN A. CALVERT, Assistant Examiner

U.S. Cl. X.R.

166—275